US005570466A

United States Patent [19]

Oechsle

[11] Patent Number: 5,570,466
[45] Date of Patent: Oct. 29, 1996

[54] MULTIPLE PATH TREES AND LAN SEGMENTS FOR ROUTING IN A NETWORK OF BRIDGE-CONNECTED LAN SEGMENTS

[75] Inventor: Rainer Oechsle, Langnau am Albis, Switzerland

[73] Assignee: International Business Machines Corporation, Armonk, N.Y.

[21] Appl. No.: 372,693

[22] Filed: Jan. 13, 1995

Related U.S. Application Data

[63] Continuation of Ser. No. 838,126, Feb. 19, 1992, abandoned.

[30] Foreign Application Priority Data

Oct. 14, 1991 [EP] European Pat. Off. .............. 91810791

[51] Int. Cl.$^6$ ....................................................... H04J 3/24
[52] U.S. Cl. .................. 395/200.15; 370/85.13; 364/DIG. 1
[58] Field of Search .............................. 395/200.15, 800, 395/200.16, 200.17; 370/60, 61, 85.13, 85.14

[56] References Cited

U.S. PATENT DOCUMENTS

| | | | |
|---|---|---|---|
| 4,423,414 | 12/1983 | Bryant et al. | 340/825.07 |
| 4,706,080 | 11/1987 | Sincoske | 340/825.02 |
| 4,740,954 | 4/1988 | Cotton et al. | 370/60 |
| 4,922,503 | 5/1990 | Leone | 370/85.13 |
| 4,947,390 | 8/1990 | Sheehy | 370/85.13 |
| 5,018,133 | 5/1991 | Tsukakoshi et al. | 370/16 |
| 5,088,090 | 2/1992 | Yacoby | 370/85.13 |
| 5,103,444 | 4/1992 | Leung et al. | 370/60 |

FOREIGN PATENT DOCUMENTS 4000673  7/1991  Germany.

OTHER PUBLICATIONS

"Comparinson of two Bridge Routing Approaches", Zhang IEEE Jan 1988, vol. 2, No. 1, p. 44–48.
"Lan Interconnection: A Transparent, Shortest Path Approach" Tai et al, IEEE 1991, pp. 1666–70.
"Brouter: The transparent Bridge with Shortest Path in Interconnected Lans," Lin et al, IEEE 1991, pp. 175–181.
"Load Sharing and Shortest Path Routing in Transparently. . . " Faiman, IEEE 1991, pp. 1135–1144.
"An End to a Bridging Feud", Data Communications International, May, 1990, No. 6, pp. 33–34.

Primary Examiner—Krisna Lim
Assistant Examiner—Viet Vu
Attorney, Agent, or Firm—Joscelyn G. Cockburn

[57] ABSTRACT

For routing of frames through a system of bridge-connected network segments, a routing table is stored in each bridge, and each frame includes fields for a source segment identifier and a destination segment identifier. The routing tables reflect predetermined paths to each network segment as destination. For routing of a normal transmission frame, only the destination segment identifier included in the frame and a table look-up in each bridge are required. For deriving unknown routing information, a discovery frame is sent from source to destination terminal, initially including empty source and destination segment fields. Using the stored routing tables, bridges insert segment identifiers and forward discovery frames in such a way that only one arrives at the destination, carrying the correct source segment identifier and destination segment identifier which are then returned to the source terminal.

8 Claims, 5 Drawing Sheets

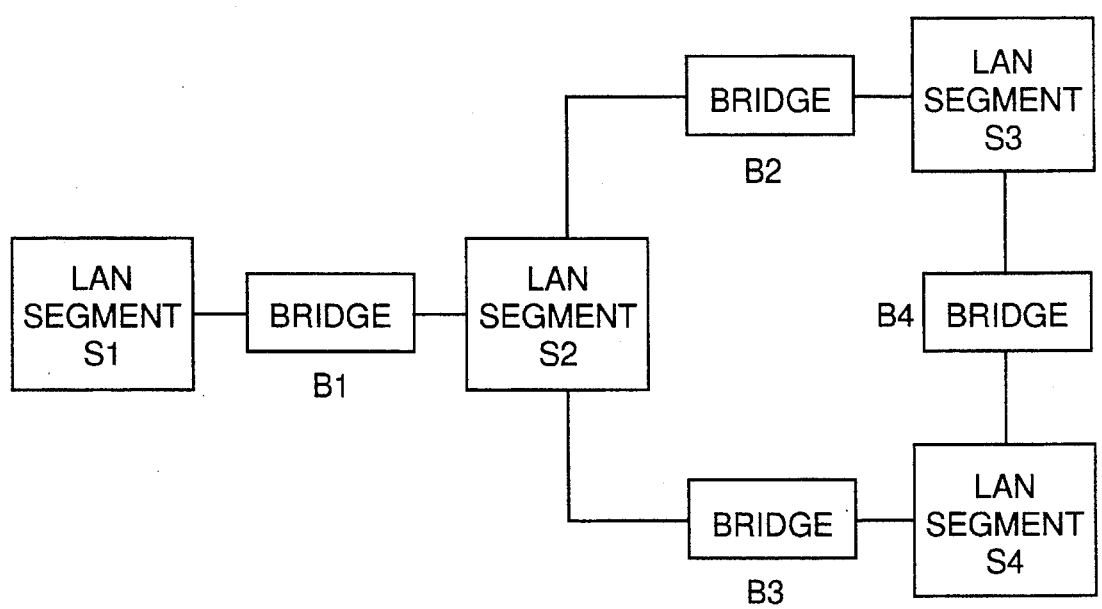
Figure 4A
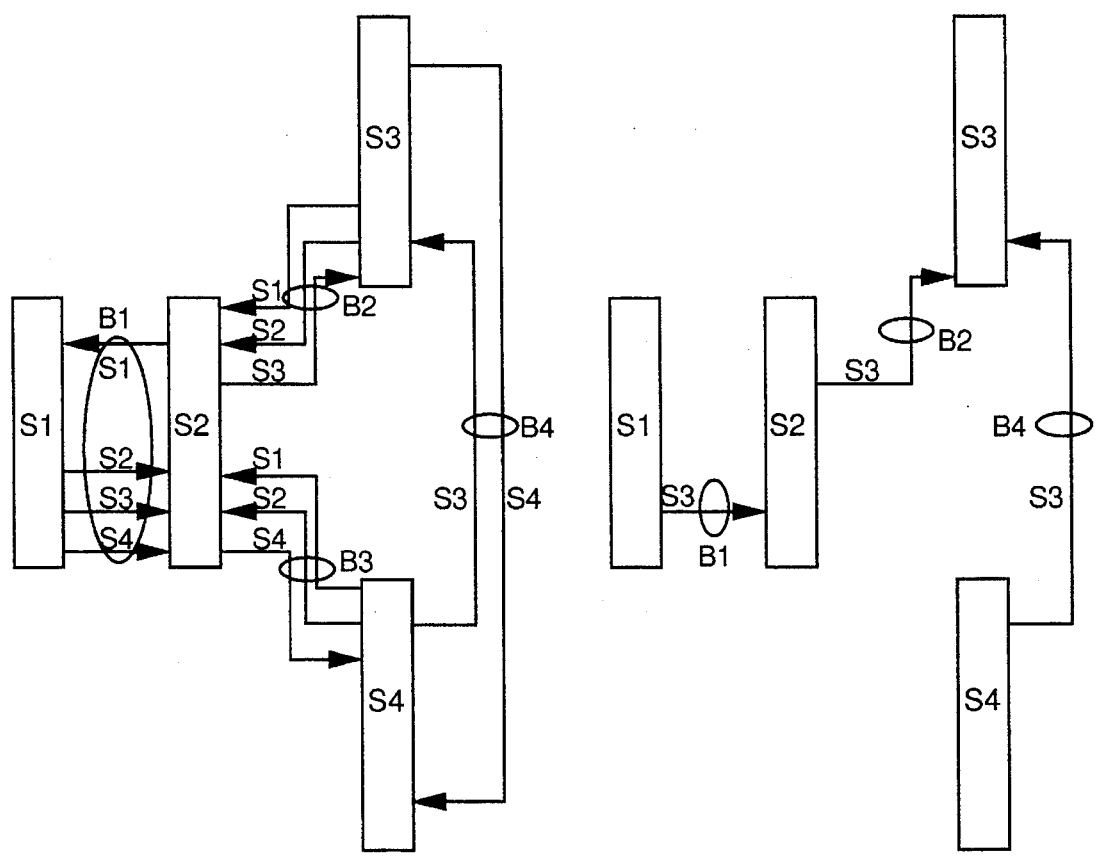
Figure 4B
Figure 4C

MULTIPLE PATH TREES AND LAN SEGMENTS FOR ROUTING IN A NETWORK OF BRIDGE-CONNECTED LAN SEGMENTS

This is a continuation of application Ser. No. 07/838,126, filed Feb. 19, 1992, abandoned.

FIELD OF INVENTION

Present invention is concerned with the routing of data blocks or frames in a local area communication system consisting of a plurality of LAN segments interconnected by bridges.

BACKGROUND

In a LAN communication system consisting of several segments interconnected by bridges, some routing must be provided for properly guiding addressed information units such as frames through the bridges between segments. Improper routing procedures will lead to increased transmission times and will waste transmission capacity.

A general survey of routing techniques is given in an article by M. Schwadz et al. entitled "Routing Protocols", published in the book "Computer Networks and Protocols" (Ed. C. A. Sunshine), Plenum Press, New York 1989, pp.239–271. Besides various other techniques, the usage of shortest path trees for routing is described. This technique is established at the network layer. It relies on structured network addresses from which the network (segment) numbers can be inferred. Routing is done according to these network numbers. This technique is not directly applicable to bridging because MAC addresses are taken from a flat address space without any structure.

Broadcast routing also involving shortest path trees is described in an article by Y. K. Dalal et al.: "Reverse Path Forwarding of Broadcast Packets", Communications of the ACM, Vol.21, No.12, pp.1040–1048 (December 1978).

For LAN communication systems comprising several bridged segments, two bridging techniques are in widespread use today. They are called "Transparent Spanning Tree Bridging" and "Source Routing Bridging", respectively.

The Transparent Spanning Tree scheme is described e.g. in F. Backes: "Transparent Bridges for Interconnection of IEEE 802 LANs", IEEE Network, Vol.2, No.1, pp.5–9 (January 1988). The basic idea of the Transparent Spanning Tree bridging technique is to configure the bridges in such a way that the bridges and the LAN segments form a spanning tree. All bridges listen to all traffic on the LAN segments they are attached to and learn by looking at the source addresses in which direction a terminal is located. Based on this knowledge the bridges forward the frames along the spanning tree. If a destination address is unknown, the frame is broadcast to all LAN segments along the spanning tree.

This bridging technique has several deficiencies: (1) Since the LANs and bridges form a single spanning tree, in general only a subset of the available bridges can be active at any point in time. The other ones are only used as standby bridges for backup. (2) Because of the spanning tree, a route between two LAN segments may be far from optimal. Thus a frame from one LAN segment to another segment may follow a route via a large number of bridges and LAN segments although the source and destination LAN segments are directly connected by a bridge, but that bridge is not pad of the present spanning tree. (3) Transparent Spanning Tree bridges have to copy and process every frame because of the necessary learning of MAC addresses. So a bridge may be very busy without forwarding any frame. (4) Since the constantly updated table of destination addresses may become rather large, the time needed for address table lookup may become significant so that forwarding may take quite some time.

The Source Routing scheme is described in R. C. Dixon et al.: "Addressing, Bridging, and Source Routing", IEEE Network, Vol.2, No.1, pp.25–32 (January 1988). The basic idea of the Source Routing bridging technique is to have routing information included in every frame by the source terminals. The information describes the whole path the frame has to take starting from the source LAN segment through all intermediate bridges and LAN segments to the destination LAN segment. The bridges thus simply forward the frames based on this routing information. Before the routing information can be used, discovery frames from the source to the destination terminal are sent throughout the network with the bridges recording the routes in the discovery frames and discarding circling frames. The destination terminal replies to these discovery frames so that the source terminal also learns the route. One of several routes may be selected by either the source terminal or the destination terminal.

This bridging scheme also has some shortcomings: (1) There is an upper bound for the routing information carried inside the MAC frames. If this upper bound is low, routing is restricted to a small number of hops. If it is high, the frame overhead is becoming significant in length. (2) It is not possible to change the routing behaviour in a bridged LAN in a way transparent to the terminals, because a source route exactly prescribes the path through the network that the frame has to follow. Thus there is no way to adapt the network to changing traffic loads without the terminals being involved.

OBJECTS OF THE INVENTION

It is therefore an object of present invention to provide a bridging technique for bridged LAN systems which avoids the disadvantages of known bridging schemes. In particular, it is an object of the invention to devise a bridging technique which needs only moderate length routing tables in bridges, requires inclusion of minimal routing information in transmitted frames, allows fast forwarding of frames through the bridges, and enables efficient handling of discovery frames for determining the routing information which a terminal needs for transmitting frames to a partner terminal of which the location is unknown.

SUMMARY OF THE INVENTION

These objects are achieved by a method of routing frames through a network consisting of network segments interconnected by bridges.

The invention provides following advantages:

The topology is not restricted to a single spanning tree.

The size of the routing tables is in the order of the number of LAN segments which is supposed to be within reasonable limits. Therefore, table lookup is much more efficient than in a system where entries for all addresses are required.

Because of the small size of routing tables and the fixed location of the relevant routing information in each frame, the decision whether to copy a frame or not may be done by the adapter hardware. There is no need to process frames that do not have to be forwarded., There is no flooding of the bridged LAN during the discovery phase. A discovery frame is broadcast to each LAN segment exactly once.

There is no restriction in the length of paths on which frames are routed, but the length of the routing information in frames is fixed and small.

Dynamic adaptation of the forwarding behaviour of the bridges can be achieved by changing the shortest paths trees.

These and other advantages will become apparent from a preferred embodiment of the invention which is described in the following with reference to drawings.

LIST OF DRAWINGS

FIGS. 4A, 4B, and 4C give a schematic representation of a bridged LAN segment network and shortest paths trees in such network.

Figure 5:
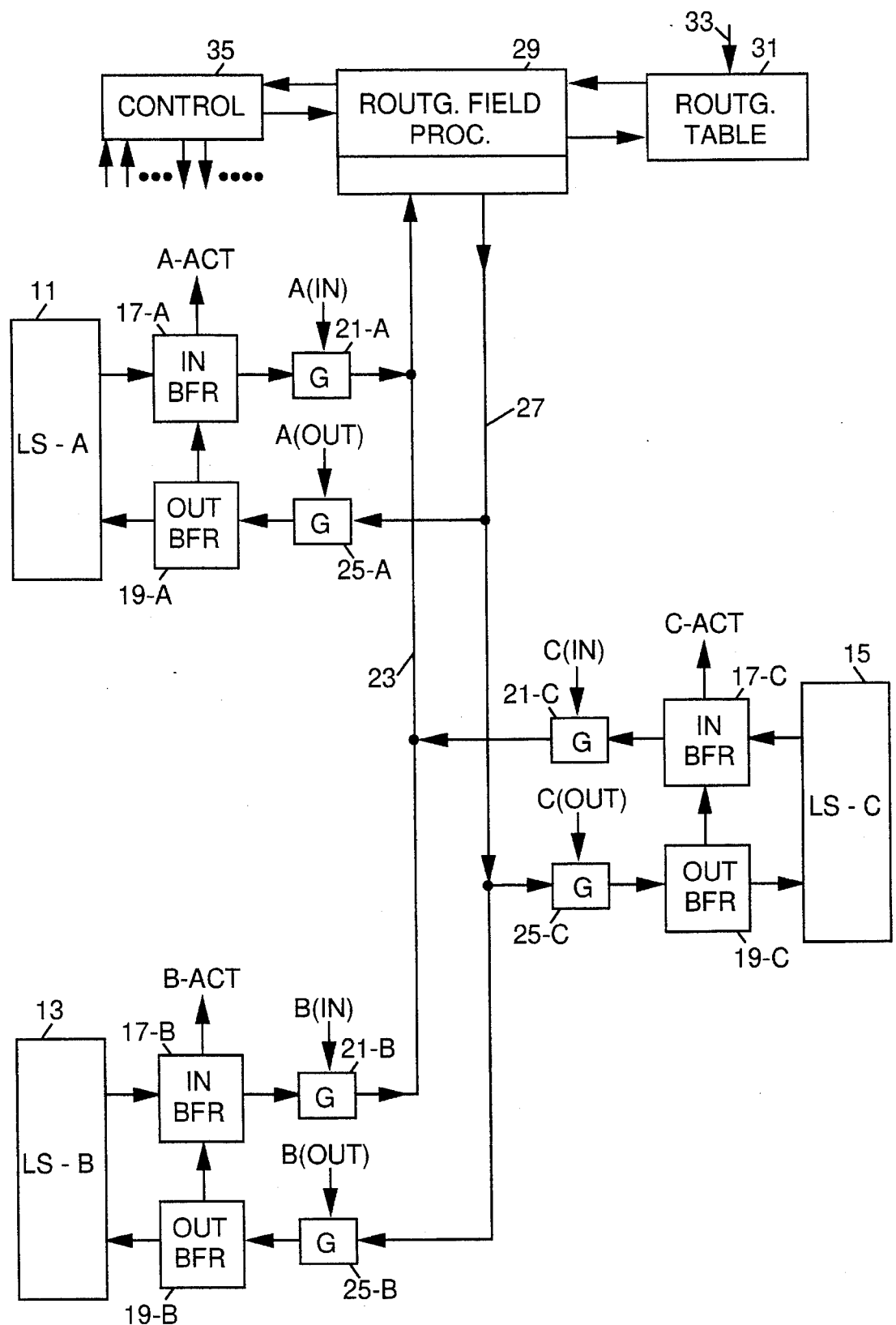

FIG. 5 is a block diagram of some functional units provided in a bridge implementing the invention.

Figure 6:
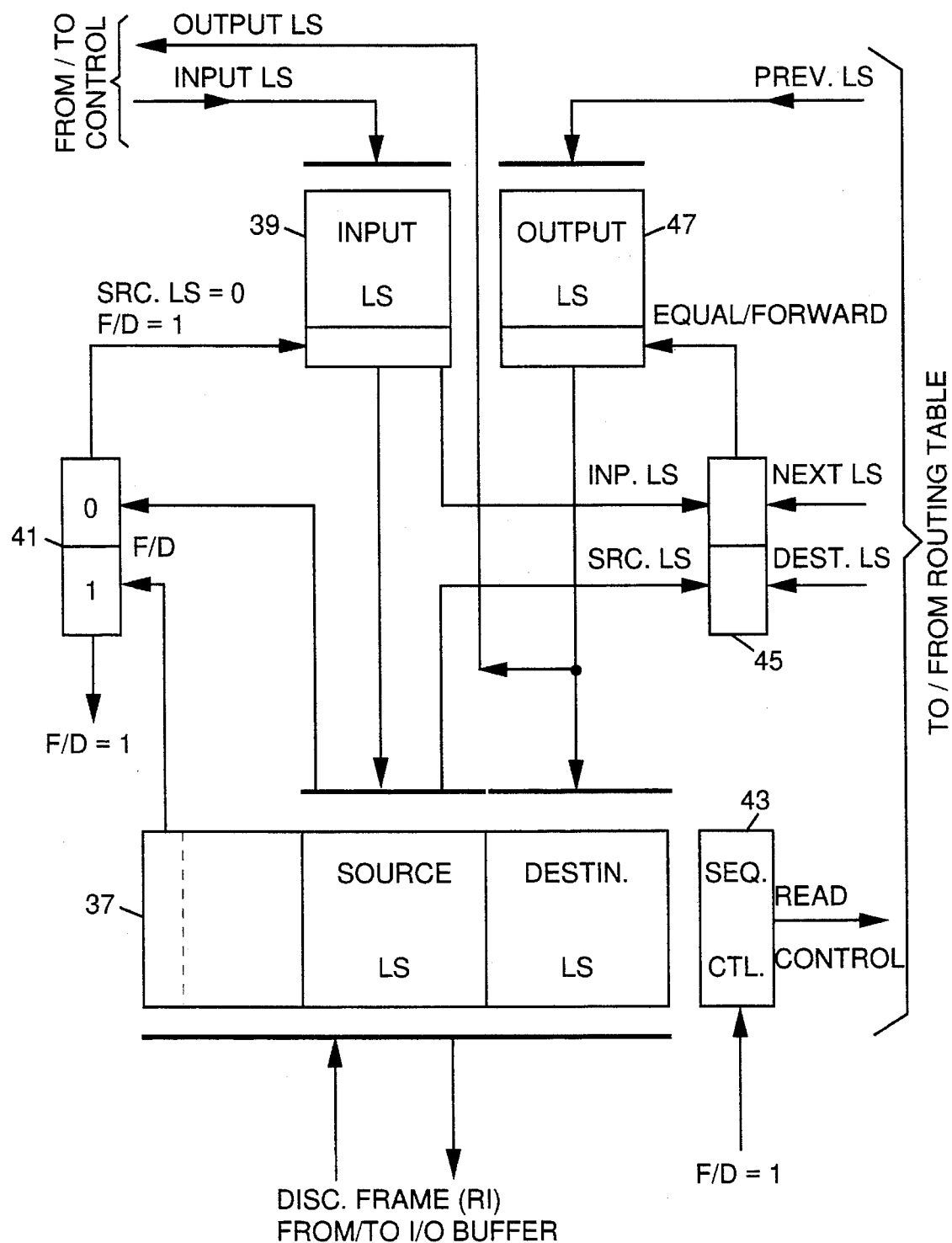

FIG. 6 is a block diagram of some functional units provided in a bridge for implementing the invention, in particular for testing and modification of the routing information field of discovery frames.

DETAILED DESCRIPTION

1) LAN Network Configuration

Figure 1:
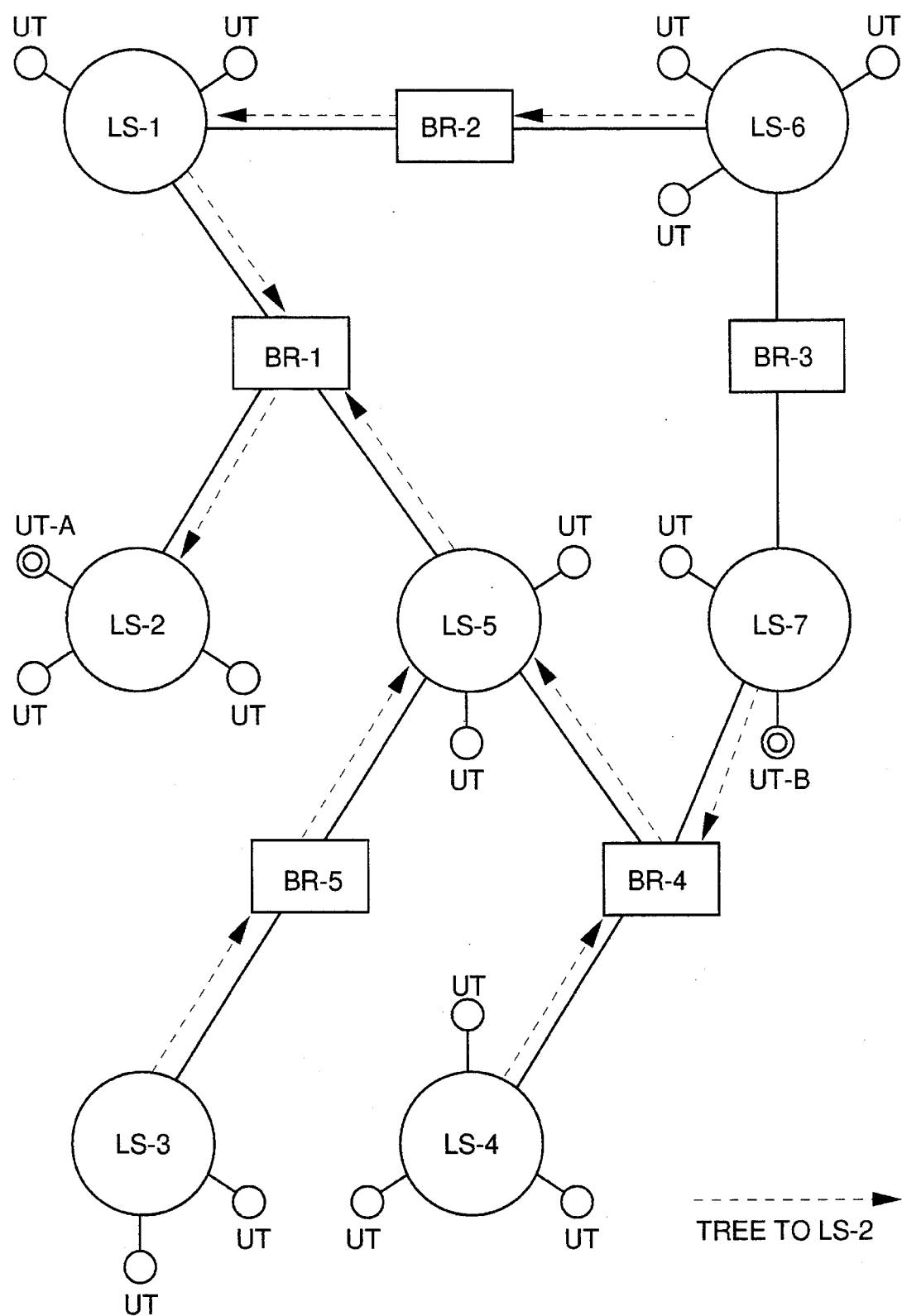
FIG. 1 shows the configuration of a typical local area communication network consisting of bridge-connected LAN segments, in which the invention can be used, including a sample of a shortest paths tree.

FIG. 1 illustrates a type of network in which the invention is used. It is a local area network (LAN), consisting of several separate LAN segments LS-1 . . . LS-7 which are interconnected by bridges BR-1 . . . BR-5. User terminals UT are connected to each of the LAN segments.

The LAN segments can be any of the known types of LANs, e.g. token ring networks, dual bus networks, etc. It is assumed here that all the LAN segments of the network are of the same type, but depending on the bridges used there could also be different types of LAN segments in the same network.

The user terminals UT are movable within the system, i.e. they are not fixedly attached to one LAN segment at one specific pod. However, each user terminal has a unique address by which it is identified within the system.

2) Transmission Format (Frame Format)

Figure 2:
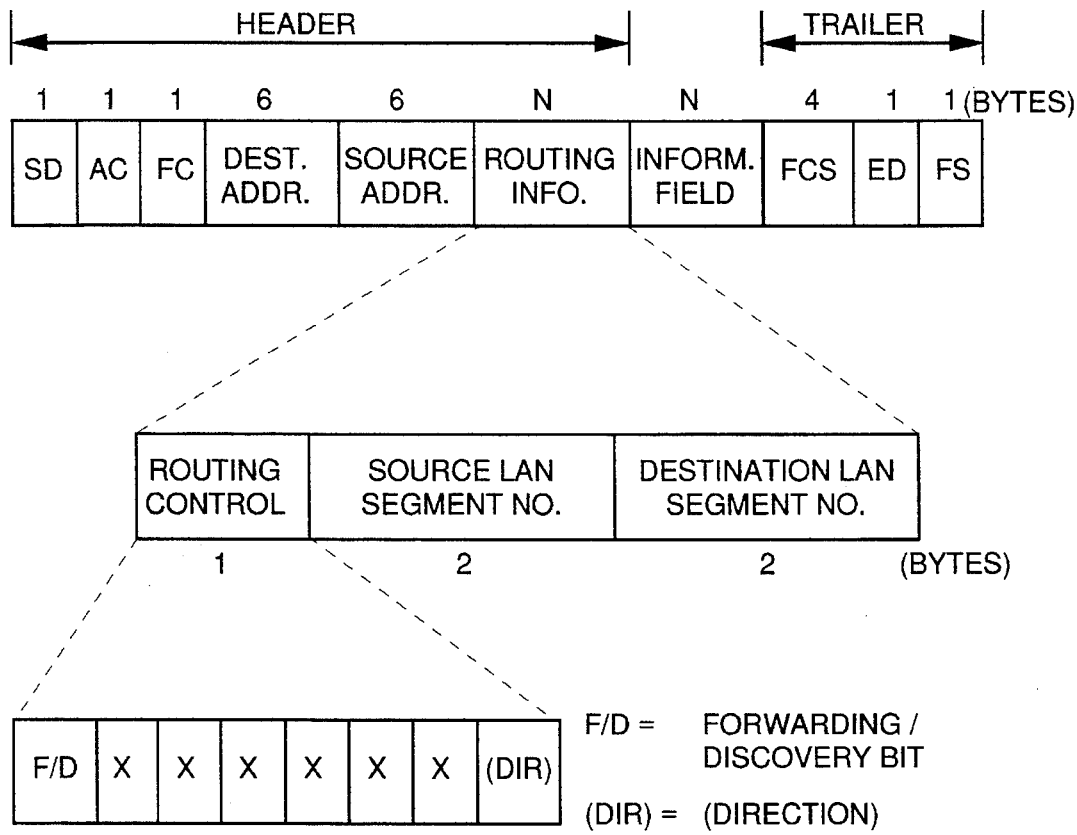
FIG. 2 shows the format of MAC frames transmitted in the system of FIG. 1, in particular the format of the routing control field as adapted for implementing the invention.

Data are transferred within the system in the form of frames. One possible format of such frames is shown in FIG. 2. It corresponds to the format defined for token ring LANs in IEEE 802.5. The frame has a header, an information field (optional), and a trailer. The header begins with the start delimiter SD and further contains an access control field AC, a frame control field FC, two fields for a destination address and a source address, respectively, and a field for routing information RI. The information field is provided for carrying the data to be transferred. The trailer comprises fields for a frame check sequence FCS, for the end delimiter of the frame (ED), and for a frame status byte (FS). However, the invention can be used with other frame formats, provided that fields for a destination address, source address, and routing information are available.

The source and destination addresses identify the terminal stations between which the respective frame is to be transferred (the destination address could also be a multicast or a broadcast address). The routing field carries information which is used by the bridges to direct the frame to that LAN segment where the destination user terminal is attached. The invention is mainly concerned with the routing of frames in a type of network shown in FIG. 1.

Transportation of each frame is as follows: Each LAN segment which received a frame from an attached user terminal or bridge only propagates the frame to all other units attached to it. Each user terminal checks the destination address and receives the frame when its own address corresponds to the destination. Each bridge examines the routing field of each frame it receives on any of the attached LAN segments, and depending on the routing information it either forwards one copy (or plural copies) of the frame to another LAN segment (or to plural other LAN segments), or it discards the frame. Contents of specific fields may be changed by a bridge prior to forwarding a frame.

Bridges for interconnecting LAN segments are usually two-port devices, i.e. they interconnect two LAN segments and can transfer frames in either direction. However, as is shown in the system of FIG. 1, bridges could also be multiport devices. In this case, they can transfer frames from each of the LAN segments to which the bridge is connected, to any one or to a plurality of the (n−1) other LAN segments. The routing information RI will in any case determine the transfer of frames between LAN segments.

As has been briefly mentioned in the introduction there are several methods for determining the routing and for representing the routing information. Present invention proposes a particularly efficient new method of routing frames in a system comprising several LAN segments interconnected by bridges.

3) Principles of the Invention

A prerequisite for the invention is that within the network, a single (shortest) path is determined from each LAN segment to each one of the other LAN segments, and that for each of the LAN segments as destination, the predetermined paths from all other LAN segments form a tree. This is called shortest path tree bridging. A more detailed explanation will be given in connection with FIGS. 4 and 5.

It is assumed that all LAN segments in the system are assigned a unique identification number (or code). The term "shortest path" means optimum path, not necessarily in terms of length but in terms of any characteristic such as delay, transmission cost, availability, etc. In this respect, bridges may be assigned weights reflecting their capability and efficiency.

Methods for determining shortest paths forming a tree are known e.g. from the publication by M. Schwartz et al. entitled "Routing Protocols", mentioned in the introduction already. Determination of shortest path trees can be done either centrally or distributed. It can further be done prior to operation at network configuration time, or it can be done dynamically (adaptively) during operation.

The invention uses the shortest path trees in the following manner:

a) Routing Tables in Bridges

Figure 3:
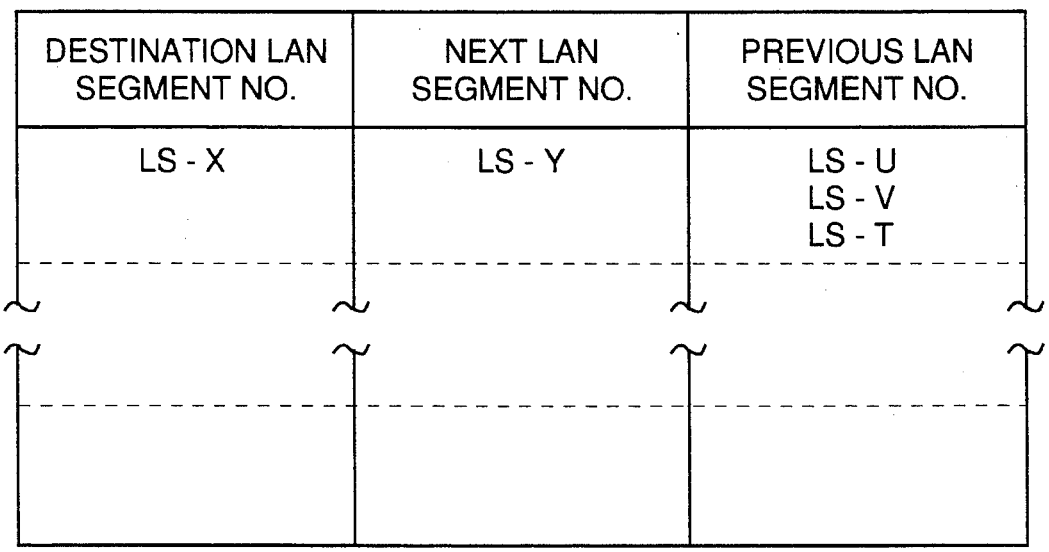
FIG. 3 illustrates the format of routing tables for bridges, which are provided for implementing the invention.

A table is stored in each bridge reflecting the shortest path trees previously determined. FIG. 3 shows the format of such a table. It contains an entry for each path tree which is going through the respective bridge. The entry comprises: the LAN segment number of the "Destination LAN Segment" of the respective path tree; the LAN segment number of the "Next LAN Segment" (neighbour) to which the bridge must forward a frame carrying the respective destination (next hop); and one or more LAN segment numbers of those "Previous LAN Segments" on which frames can arrive for the respective destination (previous hops). Thus, the tables not only contain routing information for forwarding frames to their destination, but also reflect the tree structure by including the previous LAN segments for each destination.

b) Forwarding-Frames (Normal Transmission)

For transmitting frames from a source to a destination at a known LAN segment, the routing information RI comprises only the Source LAN Segment number and the Destination LAN Segment number (besides the addresses of the source user terminal and destination user terminal). A respective format of the routing information field has to be provided in the frames, cf. the lower portion of FIG. 2: It comprises three fields; one for routing control information, and the two others for a Source and a Destination LAN Segment number, respectively. The routing control field includes, besides several bits not relevant for present invention, a single bit (F/D) for distinguishing between forwarding-frames (as described in present paragraph) and discovery-frames (to be explained in the next paragraph). One of the routing control field bits could be used for indicating the direction of transmission (DIR), as will be briefly explained in section 9.

When a bridge detects a forwarding-frame, it needs only examine the Destination LAN Segment number and determine whether its routing table contains this number. If this is true, then the frame is forwarded to the Next LAN Segment indicated in the respective table entry (provided that the entry also lists as Previous LAN Segment the one from which the frame was just received); otherwise, the frame is discarded by the bridge. This allows the transfer of frames through bridges with a minimum of routing operations.

c) Discovery-Frames (Determining Destination LAN Segment)

For determining the number of the LAN segment to which a desired destination user terminal is attached, discovery-frames and a respective handling procedure are provided, according to the invention. A source user A, when sending a discovery-frame, enters its source address, the destination address of the respective communication partner B, sets the FID bit in the routing control field to "discovery", and enters zeros into the Source and Destination LAN Segment number fields to indicate that these fields are empty. Instead of all zeros, also any particular code (number) or the setting of one particular bit could be used for indicating that a LAN segment number field is empty.

The discovery-frame is now forwarded, from the Source LAN Segment, to each of the other LAN segments in the network, along the shortest path tree of which the Source LAN Segment is the root (reverse path forwarding, as mentioned in the Dalai et al. article cited in the introduction). The forwarding is done using the stored routing tables in each bridge, as will be explained in more detail later. Essentially, the following happens: All bridges attached to the Source LAN Segment fill in the Source LAN Segment number as well as the number of the LAN segment to which the frame is going to be forwarded. All other bridges simply overwrite the Destination LAN Segment number by the number of the segment to which they are going to forward this frame.

In more detail, the following operations are executed in the bridges: In each first bridge on the paths of the discovery-frame (and its copies), the Source LAN Segment number is entered into the respective field: the first bridge detects that the field is empty (contains zeros or a particular code) and knows from which LAN segment it received that frame. The first bridge forwards a copy of the discovery-frame to all LAN segments which are on a shortest path TO the Source LAN Segment, entering the segment number of the respective Previous LAN Segment into the Destination LAN Segment field. Each further bridge which detects the frame, forwards a copy of it to each Previous LAN Segment if on a path to the source through that bridge, changing the Destination LAN Segment number respectively (by entering the Previous LAN Segment number).

In this manner, a copy of the discovery-frame is received exactly once in each of the (n–1) LAN segments, with the respective segment number carried in the Destination LAN Segment field. The destination user B receives the frame, detects it as discovery-fame, and then swaps the source and destination addresses and the source and destination LAN segment numbers, sets the routing control FID bit to "forwarding" and then returns the frame to the source user A which originated it. User A then stores one of the received LAN segment numbers, i.e. the one which arrived at its partner B as Destination LAN Segment number (but which the source user A now received back as Source LAN Segment number), as Destination LAN Segment number for further use in forwarding-frames (normal transmission) with the respective destination user address B, and it further stores the other received LAN segment number as its own Source LAN Segment number (if not yet known to it previously).

This procedure has the advantage that the discovery-frame is transferred only once to each LAN segment, whereas with a general broadcasting procedure, the discovery-frame could arrive several times at its destination, requiring special elimination and selecting steps and using transmission capacity for unnecessary frame copies on the network. Furthermore, only two LAN segment numbers have to be carried by the discovery-frame (instead of a whole sequence as in source routing).

Instead of swapping destination and source fields, the receiver of discovery frame could set a direction bit, as is briefly explained in section 9.

4) Shortest Path Tree Principle

The principle of shortest path trees used for the invention is illustrated in FIGS. 4A, 4B and 4C for a somewhat simpler network than that of FIG. 1. The network includes four LAN segments S1 . . . S4 interconnected by four bridges B1 . . . B4, as shown in FIG. 4A.

The selected shortest paths between all LAN segments, forming four trees each having one of the LAN segments as destination (root of the tree), are illustrated in FIG. 4B, which shows for each bridge all the shortest paths going through it. From this information, the routing table for each bridge is derived. Bridge B2 is taken as an example. The following table entries will result for B2 (a path to segment "i" is designated as P-Si):

| (Path) | Destination LAN Segm. | Next LAN Segm. | Previous LAN Segm. |
|---|---|---|---|
| (P-S1) | S1 | S2 | S3 |
| (P-S2) | S2 | S2 | S3 |
| (P-S3) | S3 | S3 | S2 |
| — | | S4 | no entry | no entry |

To more clearly show the tree structure, the shortest paths to LAN segment S3 are extracted from FIG. 4B and separately shown in FIG. 4C. A discovery-frame originating in a user terminal connected to S3 will be forwarded along the paths of this tree in a reverse direction. Bridge B3 through which no shortest path leads to S3 will not forward any discovery-frame which has S3 as source (though it sees these discovery frames on LAN segments S2 and S4). A similar shortest path tree structure could be extracted for each of the other LAN segments.

Following should be noted here: (1) The path between two LAN segments need not be the same for both directions, i.e. the shortest path from A to B can be different from the shortest path from B to A. An example will be given in the next section. (2) While all the shortest paths TO one LAN segment (from all other LAN segments) must form a tree, the paths FROM one LAN segment to all other LAN segments need not be a tree. This fact significantly simplifies the construction of the shortest paths. However, in the simple examples given in this description, trees are formed by the shortest paths in both directions.

5) Shortest Path Structure for Sample Network

In Tables 1 and 2, representative shortest path trees and the resulting routing tables are given for the sample network of FIG. 1. Each shortest path is represented as a sequence of numbers a-(b)-c-(d)-e where the leftmost number is the source and the rightmost number is the Destination LAN Segment; the numbers in parentheses are the bridges which are pad of that path. Note that between LS-3 and LS-6 and also between LS-5 and LS-6, shortest paths are different in the two directions (indicated by "#" and "%" in Table 1).

a) Shortest Path Tree for one LAN Segment

In the network represented by FIG. 1, one of the shortest path trees, i.e. that for LAN segment 2, is shown by dashed lines with arrows (i.e. the tree comprising the shortest paths from each LAN segment to LS-2).

b) Handling of Discovery-Frame in Sample Network

In FIG. 1, there are also indicated a source user terminal UT-A at LAN segment 2, and a destination user terminal UT-B at LAN segment 7, for illustrating the handling of a discovery-frame which is sent from terminal A to terminal B. As indicated above, the discovery-frame will contain initially the addresses of terminals A and B, and two empty LAN segment number fields in the routing information field. The contents of these fields will be represented in the following by SRC/LS=x for the source, and by DST/LS=y for the destination LAN segment, with x and y being changed in the bridges where appropriate.

The discovery frame is placed by terminal A on LS-2 and is received by BR-1, which then inserts SRC/LS=2 because it is a discovery frame with an empty source LAN field received from LAN segment 2. (SRC/LS is thereafter not changed anymore). BR-1 then inserts DST/LS=1 and DST/LS=5 into two copies of the discovery-frame and forwards them to LS-1 and LS-5, because its routing table lists these two LAN segments as "previous" for the destination LAN LS-2.

Via LS-1 the discovery-frame is received in BR-2 which inserts DST/LS=6 into one copy of the frame which it forwards to LS-6, because this LAN segment is listed as "previous" in its routing table for destination LAN LS-2. The frame is further received, via LS-6, by BR-3. This bridge does not find LS-2 as destination in its routing table and therefore ignores the discovery-frame. Thus, one copy of the frame has reached LAN segments LS-1 and LS-6 but is discarded in both because no user terminal receives the frame.

Via LS-5, the discovery-frame with DST/LS=5 is received in the two bridges BR-4 and BR-5. BR-5 finds in its routing table for destination LAN LS-2 a "previous" entry LS-3. Thus, it enters into a copy of the discovery frame DST/LS=3 (overwriting the previous entry DST/LS=5) and forwards the frame to LS-3. There the frame is discarded because no user terminal receives it and no further bridge is connected to LS-3.

In bridge BR-4, the routing table lists as "previous" for destination LAN LS-2, the two LAN segments LS-4 and LS-7. Therefore, BR-4 enters DST/LS=4 and DST/LS=7 into two copies of the discovery-frame which it forwards to the respective LAN segments. In LS-4, the frame is discarded for the same reasons as in LS-3. However, user terminal B connected to LS-7 receives the discovery-frame, which at that time contains LS-2 as Source LAN Segment number and LS-7 as Destination LAN Segment number. Terminal B then swaps the two user terminal addresses and the two LAN segment numbers, converts the frame into a forwarding-frame and sends it back to user terminal A. When it is received there, LS-7 is extracted from the frame and stored as Destination LAN Segment number in connection with terminal address B. Furthermore, if terminal A did not yet know to which LAN segment it is connected, it stores LS-2 (received in the returning frame) as its own Source LAN Segment number for future use in forwarding-frames.

It should be noted that the discovery-frame when propagating on LS-7 is also again received by bridge BR-3. However, as LS-2 is not listed in the latter's routing table as destination, the second copy of the discovery-frame which reaches BR-3 is also ignored.

c) Transfer of Forwarding-Frames When terminal A thereafter wants to send a frame to terminal B, it inserts LS-7 into the Destination LAN Segment field of the frame. BR-1 will pick up the frame propagating on LS-2, and will forward the frame to LS-5 because the latter is listed in its routing table as "next" for destination LAN LS-7 and because LS-2 is listed as "previous". Then, bridges BR-4 and BR-5 will see the frame propagating on LS-5. BR-5 will ignore the frame because for the destination LS-7 listed in its routing table, frames are to be transferred to LS-5 but only if they came from LS-3 which is not the case. BR-4 will forward the frame to LS-7 because this is listed as "next" for frames coming from "previous" LS-4 and LS-5 (the latter is true in this case). On LS-7 the frame is then received by its actual destination terminal B. Also bridge BR-3 will see the frame propagating on LS-7. However, its routing table indicates that frames for LS-7 are only to be forwarded (to LS-7) if arriving from "previous" LS-6. This is not the case and therefore the frame is ignored by BR-3.

7) Rules for Handling of Frames in Bridges
   a) Detect arrival of frame and extract routing information.
   b) Determine whether DISCOVERY-frame or FORWARDING-frame (examine respective indicator bit F/D in routing control field).
   c1) For DISCOVERY-frame:
      c1a) Detect whether Source_LAN_Segm. field empty.
         If empty=Insert LAN segm. number of input LAN segm. from which discovery-frame was received.
         If not empty: Don't change contents of Source_LAN_Segm. field.
      c1b) Check whether LAN segm. number contained in Source LAN Segm. field, is contained as Destination_LAN_Segm. number in an entry of local routing table, and if same entry lists a Next_LAN_Segm. number which corresponds to the input LAN segment from which the discovery-frame was received.
         If no: Disregard discovery-frame.
         If yes: Copy discovery-frame for each Previous_LAN_Segm. number contained in respective entry insert respective Previous_LAN_Segm. number into copy as Destination_LAN_Segm. number and transfer discovery-frame to respective LAN segment as output.
   c2) For FORWARDING-frame:
      Check whether Destination_LAN_Segm. number contained in forwarding-frame is contained as Destination_LAN_Segm. number in an entry of local routing table, and whether forwarding-frame was received from an input LAN segment which is listed as Previous_LAN_Segment in same entry.
      If no: Disregard forwarding-frame.
      If yes: Transfer forwarding-frame to the LAN segment listed as Next_LAN_Segment in respective entry.

8) Example of a Bridge Applying Routing Principles of the Invention

FIG. 5 is a block diagram of a possible bridge implementation, showing functional units for executing the invention. This sample bridge is a three-port bridge, i.e. one which directly interconnects three attached LAN segments LS-A, LS-B, and LS-C (11, 13, 15). For each connected LAN segment LS-i, the bridge has an input buffer 17-i and an output buffer 19-i. Each input buffer is connected via a gate 21-i to a common input bus 23, and each output buffer is connected via a gate 25-i to a common output bus 27. Routing field processor means 29 is provided, (a) for examining the routing information of incoming frames, which is transferred to the processor means via the input bus according to the given rules (which were presented above in section 7 and which are incorporated in the processor means), and (b) for either forwarding the respective frame from one LAN segment to one or both other LAN segments via the input/output buses by appropriate gating, changing the contents of the routing field of the frame where required, or for discarding the respective frame stored in an input buffer.

Storage means 31 is provided for the routing table and is connected to the routing field processor means 29. The routing table is loaded into the bridge through an input 33 by network management when the shortest path trees were determined, and when an appropriate subset was prepared as routing table for the respective bridge (as mentioned above already). Control means 35 which is also connected to the routing field processor means 29 sends and receives control signals to and from the gates 19-i/25-i and the input buffers 17-i. Respective control signals are i-ACT for indicating availability of a received frame in an input buffer, and i(IN) as well as i(OUT) for gating the respective buffer contents to/from the input/output buses.

In FIG. 6 means for discovery-frame testing and modification in a bridge are illustrated. The routing information field of an arrived frame is held in register means 37. The respective input LAN segment number from which the frame was received is held in register means 39. Testing means 41 detect whether it is a discovery-frame (FID=1), and whether the Source LS field contains all zeros. If that is the case, the input LS number is loaded into the Source LS field of the frame.

Then, if the frame is a discovery-frame (F/D=1), a sequence control 43 is started for sequentially reading out entries of the bridge's routing table for comparison. A test is made in comparing means 45 for each entry of the bridge's routing table whether the Destination LS number in the table corresponds to the Source LS number in the frame, and whether the Next LS number in the table entry corresponds to the input LS number of the respective frame. If that is the case, each Previous LS number of the table entry is sequentially entered into register means 47 and is loaded into the Destination LS field of the discovery-frame. The discovery-frame is then forwarded, with the routing field contents as available in register means 37, to an output LAN segment indicated by contents of register means 47, whose number is now contained as Destination LS number in the routing field of the frame.

9) Alternatives/Additional Features
   a) Compatibility with Existing Routing Protocols In above description it was suggested that the routing information field of each frame includes, besides routing control information, only two fields for LAN segment numbers (source and destination). To maintain compatibility with protocols which provide variable length routing information fields, as e.g. in systems using source routing, following variation is possible: The length indicator in the routing control field which states the actual length (number of bytes for representing LAN segment numbers) of the routing information, is set to a constant value reflecting two LAN segment number fields (four bytes).

This would allow to introduce present invention in the bridges of a network without changing the user terminals (they could continue to use the variable-length protocol but would nevertheless restrict the routing information to two LAN segment numbers).

Furthermore, as indicated above already in sections 5a and 5b and in FIG. 2, a direction bit (DIR) could be provided in the routing control field (as is the case in systems using source routing). When set to "1", this bit causes all bridges and terminals to use the source and destination fields in reverse manner, so that no swapping or interchanging of source and destination is required in a terminal which returns a received frame (such as discovery-frames) to its sender. This also avoids the necessity to change terminals when the invention is introduced.

b) Establishment of Bridge Routing Tables in Tree Network

If the network per se has the form of a tree, establishment of the routing tables need not be done by advance computing but can be achieved in a learning procedure. (As an example, the network shown in FIG. 1 would be converted to a pure tree network when bridge BR-3 is eliminated.) For building up the routing tables by learning in such a system, the bridges must evaluate all forwarding-frames and discovery-frames which they receive, to gather information on which LAN segments connected to the bridge furnish frames from which source LAN segments.

This learning procedure is somewhat similar to that described in the article by F. Backes on Transparent Spanning Tree bridging, with the important difference however that for Spanning Tree bridging, large numbers of terminal addresses must be collected whereas for a system using present invention, only LAN segment identifications have to be collected whose number is only a fraction of the number of terminal addresses.

c) Servers for Discovery Procedure

Instead of having each user terminal sending its own discovery frames to prospective destination terminals, this task could be done by one or plural servers provided in the system, e.g. one server per LAN segment. A terminal would send its request for a destination terminal's LAN segment number to the server of its own LAN segment. The server (taking the role of a source terminal as described in section 3c above) would then send a discovery frame, and later return the destination LAN segment number (and if necessary the source LAN segment number) to the requestor. If the server keeps a table of user terminal addresses and of respective LAN segment numbers it had obtained in a previous discovery operation, it can respond to many discovery requests merely by looking up its table and finding a previously obtained destination LAN segment number, thus saving the circulation of a discovery frame. Only if the table did not yet contain the destination segment number for a terminal address, the server must actually send a discovery frame.

TABLE 1

Shortest Path Trees for Network of FIG. 1

| To LS-1<br>LS-BR-LS-BR-LS | To LS-2<br>LS-BR-LS-BR-LS | To LS-3<br>LS-BR-LS-BR-LS-BR-LS |
|---|---|---|
| 2-(1)-1 | 1-(1)-2 | 1-(1)-5-(5)-3 |
| 3-(5)-5-(1)-1 | 3-(5)-5-(1)-2 | 2-(1)-5-(5)-3 |
| 4-(4)-5-(1)-1 | 4-(4)-5-(1)-2 | 4-(4)-5-(5)-3 |
| 5-(1)-1 | 5-(1)-2 | 5-(5)-3 |
| 6-(2)-1 | 6-(2)-1-(1)-2 | 6-(3)-7-(4)-5-(5)-3 # |
| 7-(3)-6-(2)-1 | 7-(4)-5-(1)-2 | 7-(4)-5-(5)-3 |

| To LS-4<br>LS-BR-LS-BR-LS | To LS-5<br>LS-BR-LS-BR-LS | To LS-6<br>LS-BR-LS-BR-LS-BR-LS |
|---|---|---|
| 1-(1)-5-(4)-4 | 1-(1)-5 | 1-(2)-6 |
| 2-(1)-S-(4)-4 | 2-(1)-5 | 2-(1)-1-(2)-6 |
| 3-(5)-5-(4)-4 | 3-(5)-5 | 3-(5)-5-(1)-1-(2)-6 # |
| 5-(4)-4 | 4-(4)-5 | 4-(4)-7-(3)-6 |
| 6-(3)-7-(4)-4 | 6-(3)-7-(4)-5 % | 5-(1)-1-(2)-6 % |
| 7-(4)-4 | 7-(4)-5 | 7-(3)-6 |

| To LS-7<br>LS-BR-LS-BR-LS |
|---|
| 1-(2)-6-(3)-7 |
| 2-(1)-5-(4)-7 |
| 3-(5)-5-(4)-7 |
| 4-(4)-7 |
| 5-(4)-7 |
| 6-(3)-7 |

TABLE 2 (A)

Routing Tables for Bridges in Network of FIG. 1

| BRIDGE 1 ||| BRIDGE 2 |||
|---|---|---|---|---|---|
| Destination<br>LAN Segm. | Next<br>LAN Segm. | Previous<br>LAN Segm. | Destination<br>LAN Segm. | Next<br>LAN Segm. | Previous<br>LAN Segm. |
| LS-1 | LS-1 | LS-2 + LS-5 | LS-1 | LS-1 | LS-6 |
| LS-2 | LS-2 | LS-1 + LS-5 | LS-2 | LS-1 | LS-6 |
| LS-3 | LS-5 | LS-1 + LS-2 | LS-3 | — | — |
| LS-4 | LS-5 | LS-1 + LS-2 | LS-4 | — | — |
| LS-5 | LS-5 | LS-1 + LS-2 | LS-5 | — | — |
| LS-6 | LS-1 | LS-2 + LS-5 | LS-6 | LS-6 | LS-1 |
| LS-7 | LS-5 | LS-2 | LS-7 | LS-6 | LS-1 |

| BRIDGE 3 ||| BRIDGE 4 |||
|---|---|---|---|---|---|
| Destination<br>LAN Segm. | Next<br>LAN Segm. | Previous<br>LAN Segm. | Destination<br>LAN Segm. | Next<br>LAN Segm. | Previous<br>LAN Segm. |
| LS-1 | LS-6 | LS-7 | LS-1 | LS-5 | LS-4 |
| LS-2 | — | — | LS-2 | LS-5 | LS-4 + LS-7 |
| LS-3 | LS-7 | LS-6 | LS-3 | LS-5 | LS-4 + LS-7 |
| LS-4 | LS-7 | LS-6 | LS-4 | LS-4 | LS-5 + LS-7 |
| LS-5 | LS-7 | LS-6 | LS-5 | LS-5 | LS-4 + LS-7 |
| LS-6 | LS-6 | LS-7 | LS-6 | LS-7 | LS-4 |
| LS-7 | LS-7 | LS-6 | LS-7 | LS-7 | LS-4 + LS-5 |

TABLE 2 (B)

Routing Tables for Bridges in Network of FIG .1
BRIDGE 5

| Destination LAN Segm. | Next LAN Segm. | Previous LAN Segm. |
|---|---|---|
| LS-1 | LS-5 | LS-3 |
| LS-2 | LS-5 | LS-3 |
| LS-3 | LS-3 | LS-5 |
| LS-4 | LS-5 | LS-3 |
| LS-5 | LS-5 | LS-3 |
| LS-6 | LS-5 | LS-3 |
| LS-7 | LS-5 | LS-3 |

I claim:

1. A method of routing frames through a network comprising of network segments interconnected by bridges, each network segment having a unique identifier, said frames being transmitted between terminals connected to said network segments, the method comprising the steps of:

determining a single path between each network segment and each one of other network segments;

using each network segment as a destination network segment, determining a path tree from respective single paths leading to the destination network segment and being established between the destination network segment and the other network segments;

storing in at least one bridge a routing table having an entry for each path tree of which said at least one bridge is a part, each said entry listing for the respective path tree identifiers for the destination network segment, for the next network segment and for all previous network segments on said path tree to which said bridge is connected;

receiving in said at least one bridge a frame to be routed, said frame including an identifier for a destination network segment;

in said at least one bridge, determining
(a) if the identifier for the destination network segment in said frame corresponds to one of the identifiers for a destination network segment in said routing table, and
(b) if an identifier for an input network segment from which the frame is received corresponds to one of the identifiers for all previous network segments in said routing table; and forwarding the frame to the next network segment identify in the table if (a) and (b) determinations are positive.

2. In a network comprising of network segments interconnected by bridges, terminals connected to the the network segments and each network segment having a unique identifier a method for deriving the routing information required for frame transmissions between a source terminal and a destination terminal, with each of said terminals having a unique address comprising the steps of:

transmitting from the source terminal a discovery frame including the source terminal address, the destination terminal address, and two empty fields for a source network segment identifier and a destination network segment identifier, respectively;

in each bridge receiving the discovery frame with an empty source network segment identifier field, first inserting into said field an identifier of a network segment from which the discovery frame was received;

in each bridge, testing for each entry of the local routing table whether the source network identifier in the frame corresponds to the destination segment identifier in the entry, and whether the next segment identifier in the entry corresponds to the input network segment from which said frame was received, and if the test is positive, inserting for each previous segment identifier contained in the entry, this previous segment identifier into the destination network segment field of said frame and forwarding a copy of the frame to the network segment corresponding to said inserted previous segment identifier, but if the test is negative, discarding the frame;

receiving said discovery frame in said destination terminal, carrying the source network segment identifier for said source terminal and the destination network segment identifier for said destination terminal; and returning the source network segment identifier and the destination network segment identifier from said destination terminal to said source terminal.

3. A bridge apparatus for interconnecting LAN segments comprising:

means (31) for storing a routing table (FIG. 3) including a plurality of entries, each entry comprising a destination segment identifier, a next segment identifier, and one or plural previous segment identifiers;

means (29, 35) for correlating segment number information contained in at least one selected segment identifier field of a received frame with segment identifiers contained in a selected entry of the routing table and for generating control signals therefrom; and means (21, 23, 25, 27) for forwarding, in response to said control signals, the received frame from any connected network segment (11) to any other one (13, 15) of the connected network segments.

4. Apparatus according to claim 3, further comprising:

means (37, 39, 45) for comparing segment identifiers from an entry of said table with a network segment identifier received in a frame and with an identifier corresponding to the input network segment from which that frame was received, and for generating a forwarding control signal, and means (47), responsive to said forwarding control signal, for transferring a segment identifier from said table entry to said control signal generating means (35), for determining the output network segment to which said frame is to be forwarded.

5. Bridge apparatus for routing frames through a system including network segments interconnected by bridges, in which system each network segment has a unique identifier, and in which system for each of said network segments as destination, a tree of paths from all other network segments is predetermined; the apparatus comprising:

means (31) for storing a routing table (FIG. 3) having an entry for each path tree of which said bridge is a part, each said entry listing for the respective path tree, identifiers for the destination network segment, and for the next network segment and all previous network segments on said path tree to which said bridge is connected;

means (29, 35) for generating routing control signals as a result of correlating network segments identifiers in a received frame and network segment identifiers of said routing table;

means (37, 39, 43, 45) for comparing segment identifiers from each entry of said table with a network segment identifier received in a frame and with an identifier corresponding to the input network segment from which that frame was received, and for generating a forwarding control signal;

means (47), responsive to said forwarding control signal, for transferring a segment identifier from said table entry to said routing control signal generating means (29, 35), for determining the output network segment to which said frame is to be forwarded; and means (21, 23, 25, 27) for transferring, in response to said routing control signals, a frame from any network segment (11) connected to the bridge to any other one (13, 15) of the connected network segments.

6. The bridge apparatus according to claim 6, further comprising:

register means (37) for holding the contents of two network segment identifier fields contained as routing information in a received frame;

means (41) for detecting the presence of a discovery frame;

means (39, 41) for detecting whether a discovery frame contains an empty destination network segment identifier field, and for inserting into said field the identifier of the input network segment on which the discovery frame was received;

means (43, 45) for comparing, sequentially for each entry of the routing table, the destination segment identifier of the entry with the source network segment identifier contained in a discovery frame, and the next segment identifier of the entry with the identifier of the input network from which said discovery frame was received, and for generating a forwarding control signal; and means (43, 47) for sequentially inserting, in response to said forwarding control signal, each previous segment identifier of a routing table entry, into the destination network segment identifier field of said discovery frame, and for providing said identifier to the routing control signal generating means (29, 35), for transferring a copy of the discovery frame to an output network segment corresponding to the inserted previous segment identifier.

7. The bridge apparatus according to claim 7, further including terminals connected to network segments and for transmitting frames between terminals connected to different network segments.

8. The method of claim 1 further including the steps of;

discarding the frame if (a) or (b) determinations is negative.

* * * * *